United States Patent
Srinivasan et al.

(10) Patent No.: US 8,484,624 B1
(45) Date of Patent: Jul. 9, 2013

(54) TEST INTEGRATION TOOL

(75) Inventors: Lavanya Srinivasan, Overland Park, KS (US); Nalledath P. Vinodkrishnan, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 2459 days.

(21) Appl. No.: 10/686,422

(22) Filed: Oct. 15, 2003

(51) Int. Cl.
*G06F 9/44* (2006.01)

(52) U.S. Cl.
USPC .......................................... 717/135; 717/126

(58) Field of Classification Search
USPC .................. 717/101–103, 124–126, 134–135
See application file for complete search history.

(56) References Cited

U.S. PATENT DOCUMENTS

| 6,405,364 B1 * | 6/2002 | Bowman-Amuah | 717/101 |
| 6,546,506 B1 * | 4/2003 | Lewis | 714/38 |
| 6,601,233 B1 * | 7/2003 | Underwood | 717/102 |

OTHER PUBLICATIONS

Quinn, "D10: Validation of Inter-Enterprise Management Framework (Trial 2)", Form Consortium, No. IST-1999-10357/BRI/WP5/0230, pp. 1-64, Mar. 2002.*

Lavanya Srinivasan, et al., *Inter-Application Validation Tool for use in Enterprise Architecture Modeling*, filed Nov. 2, 2002, U.S. Appl. No. 10/285,938, Specification (38 pgs.) and Drawings (6 sheets).

Nalledath P. Vinodkrishnan, et al., *Modeling Standards Validation Tool for use in Enterprise Architecture Modeling*, filed Dec. 26, 2002, U.S. Appl. No. 10/329,436, Specification (51 pgs.) and Drawings (16 sheets).

Nalledath P. Vinodkrishnan, et al., *Analysis Data Validation Tool for use in Enterprise Architecture Modeling*, filed Nov. 1, 2002. U.S. Appl. No. 10/286,526, Specification (46 pgs.) and Drawings (9 sheets).

Nalledath P. Vinodkrishnan, et al., *Design Data Validation Tool for Use in Enterprise Architecture Modeling*, filed May 8, 2003, U.S. Appl. No. 10/431,773, Specification (37 pgs.) and Drawings (7 sheets).

Lavanya Srinivasan, et al., *Data Validation Tool for Enterprise Architecture*, filed Aug. 7, 2003, U.S. Appl. No. 10/636,121, Specification (43 pgs.) and Drawings 16 sheets).

* cited by examiner

*Primary Examiner* — Ted T Vo (57) ABSTRACT

A method of test integration for early application development is provided. The method comprises defining a business case, identifying a plurality of systems to enable the business case, identifying at least one control document including handshakes for the systems, and generating test cases for each of the systems, the test cases including the handshakes useful to test applications. A testing integration system for early application development is also provided. The system comprises an input module operable to permit selection of a plurality of systems defining a business case, a control document defining handshakes between the systems, a template operable to receive information related to the control document and further operable for arranging the systems to enable the business case, and a generator operable to generate test cases including the handshakes based on the arrangement of the systems in the template.

30 Claims, 9 Drawing Sheets

| WORKFLOW NAME | SEQUENCE DIAGRAM | OPERATION | RECEIVER | SENDER | PARAMETER ATTRIBUTES | RETURN ATTRIBUTES |
|---|---|---|---|---|---|---|
| INSTALL IP | CREATE ORDER | RETRIEVE PHYSICAL CIRCUIT | FMS | CIS | TRANSACTION LD | STRING |
| INSTALL IP | CREATE ORDER | RETRIEVE PHYSICAL CIRCUIT | FMS | CIS | CIRCUIT QUANTITY | |
| INSTALL IP | CREATE ORDER | RETRIEVE PHYSICAL CIRCUIT | FMS | CIS | SOURCE ORDER ID | |
| INSTALL IP | CREATE ORDER | SUBMIT ORDER | CIS | FSAOE | | |
| INSTALL IP | CREATE ORDER | CREATE ADMINID | INFRANET | CIS | REQUEST TYPE | INFRANET ID |
| INSTALL IP | CREATE ORDER | CREATE ADMINID | INFRANET | CIS | CUSTOMER NO. | |
| INSTALL IP | CREATE ORDER | CREATE ADMINID | INFRANET | CIS | CUST SHORT NAME | |
| INSTALL IP | CREATE ORDER | CREATE ADMINID | INFRANET | CIS | CUSTOMER NAME | |
| INSTALL IP | CREATE ORDER | CREATE ADMINID | INFRANET | CIS | IP ADDRESS | |
| INSTALL IP | CREATE ORDER | CREATE ADMINID | INFRANET | CIS | PRIVATE SRV NAME | |
| INSTALL IP | CREATE ORDER | CREATE ADMINID | INFRANET | CIS | ADDRESS TYPE | |
| INSTALL IP | CREATE ORDER | CREATE ADMINID | INFRANET | CIS | NEW CUST. FLAG | |
| INSTALL IP | CREATE ORDER | CREATE ADMINID | INFRANET | CIS | IP TUNNELING FLAG | |

Figure 11

TEST INTEGRATION TOOL

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention is directed to computer software tools, and more particularly, but not by way of limitation, to a system and method for generating test cases.

BACKGROUND OF THE INVENTION

Testing a software system is conducted by identifying a plurality of test cases and then executing these test cases. A test case may define a single complete set of inputs to the system and the expected response of the system to this input. Sometimes a test case involves a back and forth dialog between the system under test and one or more external agents, but this test case may also be defined by a set of inputs and outputs by further identifying the sequence of the input and output exchanges. The back and forth dialog between communicating systems may be referred to as handshaking between the systems. The messages exchanged by the systems may be referred to as handshakes.

For analysis purposes it may be useful to model complex business transactions at different levels of abstraction. For example, a business transaction may be identified at the highest level by a short three to twenty word phrase. At the next level of detail this single transaction may be decomposed into two or more constituent operations. At the next level of detail each of these constituent operations may be decomposed into still other operations. The results of such an analysis may be captured by a business use case comprising the short phrase identifying the business transaction, by a scenario identifying a sequence of intermediate operations which taken together accomplish the business transaction, and by several sequence diagrams, each sequence diagram representing the operations comprising a single intermediate operation. These artifacts of analysis may provide a useful starting point for software design and implementation.

As software has become more complicated, increasingly powerful software development tools have been created. Some software tools are directed to supporting a specific software development process or methodology. Such tools may provide support across several phases of a software development process. For example, they may provide support for the analysis phase, the design phase, the implementation phase, and the maintenance phase. These tools may strongly influence individual software developers to adopt and adhere to a uniform software development process.

SUMMARY OF THE INVENTION

The present embodiment provides a method of test integration for early application development. The method comprises defining a business case, identifying a plurality of systems to enable the business case, identifying at least one control document including handshakes for the plurality of systems, and generating test cases for each of the plurality of systems, the test cases including the handshakes useful to test applications.

In one embodiment a testing integration system for early application development is provided comprising an input module operable to permit selection of a plurality of systems defining a business case, a control document defining handshakes between the plurality of systems, a template operable to receive information related to the control document and further operable for arranging the plurality of systems to enable the business case, and a generator operable to generate test cases including the handshakes based on the arrangement of the plurality of systems in the template.

In one embodiment a method of using test cases for application development and testing is provided comprising defining a business case, identifying a plurality of systems to enable the business case, identifying at least one control document having sequence diagrams of the plurality of systems to enable the business case, the control document including handshakes for the plurality of systems, associating the at least one control document having the sequence diagrams and the handshakes of the plurality of systems to enable the business with a template, generating test cases for each of the plurality of systems using the template, the test cases including the handshakes useful to test applications, comparing the handshakes generated by the test cases to the handshakes employed by the application, and using the handshakes for testing the application.

In one embodiment a method of testing integration is provided comprising identifying a plurality of systems to enable a business case, identifying at least one control document including sequence diagrams and handshakes for the plurality of systems to enable the business case, positioning a first sequence diagram including at least a first and second systems of the plurality of systems to a first position in a template, positioning a second sequence diagram including at least a third and fourth systems of the plurality of systems to a second position in the template, and generating a first test case using the template, the test cases including the handshakes for the systems to enable the business case.

These and other features and advantages will be more clearly understood from the following detailed description taken in conjunction with the accompanying drawings and claims.

BRIEF DESCRIPTION OF THE DRAWINGS

For a more complete understanding of the presentation and the advantages thereof, reference is now made to the following brief description, taken in connection with the accompanying drawings and detailed description, wherein like reference numerals represent like parts.

DETAILED DESCRIPTION OF THE PREFERRED EMBODIMENTS

It should be understood at the outset that although an exemplary implementations of one or more embodiments of the present system are illustrated below, the present system may be implemented using any number of techniques, whether currently known or in existence. The present disclosure should in no way be limited to the exemplary implementations, drawings, and techniques illustrated below, including the exemplary design and implementation illustrated and described herein.

Modern software development tools provide substantial support for analysis and design activities, but they may not support test case identification activities. Developers may benefit from being encouraged to think about test cases early in development. This early consideration of test cases, in turn, may encourage the developers to design in the necessary support for testing rather than tacking on testing support as an after thought. Additionally, test cases based on the analysis model can in some sense provide an early check of the software design.

Figure 1:
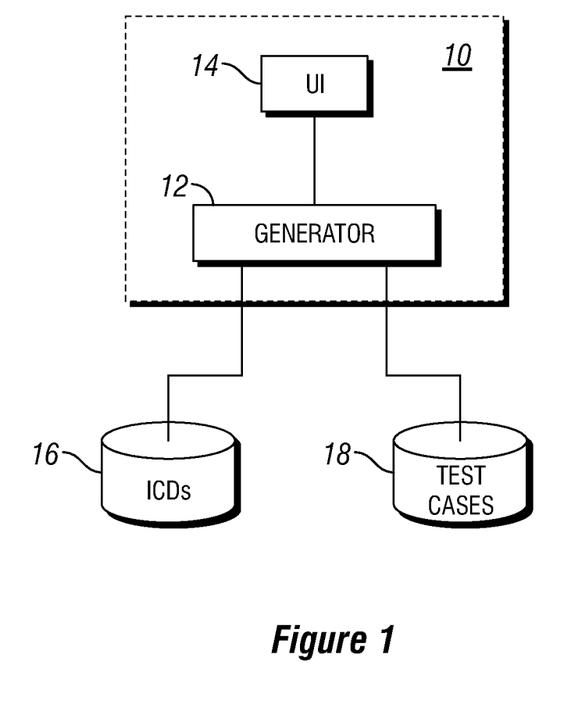
FIG. 1 is a diagram of one embodiment of a test integration tool.

Turning now to FIG. 1 a block diagram of a test integration tool 10 is depicted. A test case generator 12 is operable to accept input from a user interface 14 and to read an interface control document (ICD) 16. Based on the inputs from the user interface 14, the test case generator 12 is operable to generate a set of test cases 18. The test integration tool 10 is a software program, application, or component which may execute on a general purpose computer system or may execute in a distributed manner across multiple general purpose computer systems. General purpose computer systems are discussed in more detail hereinafter.

ICDs 16 may be a data file or database, for example, containing information describing the communications between two or more software systems, applications, components, or modules. This information may include descriptions of the structure of data exchanged between software systems, a list of the systems which communicate with each other, and communication sequence diagrams. A sequence diagram represents the communications between two or more systems and captures the sequence among these communications. These communications may also be called handshakes or system handshakes. The ICD captures the handshakes between systems.

Typically sequence diagrams graphically depict the sequence of communication between systems. The information contained in a sequence diagram need not be graphically represented, however. These sender-receiver relationships and sequential relationships can be represented in tabular form, for example, which identifies a from-system and a to-system and in which the sequence of entries in the table corresponds to the sequence of communications in time. Tabular representation of sequence diagram information may be more easily processed by software tools or software applications.

A test case describes the inputs to a system under test and the output, if any, of the system under test in response to the inputs. A test case is executed by sending the inputs to the system under test, receiving the output from the system under test, and comparing the received outputs to the expected output defined in the test case. If the received output matches the expected output the test case passes, otherwise the test case fails. The test integration tool 10 mines the ICDs 16 for information, data types, and sequence relationships and generates therefrom the appropriate test case or test cases.

The user interface 14 accepts input from a user. The user interface 14 is employed to define a scenario. A scenario may also be referred to as a workflow. The scenario is defined as a series of several intermediate level operations which are chained together to accomplish the top level operation intended by the scenario. The intermediate level operations are defined by sequence diagrams. In some cases the intermediate level operations may occur concurrently. The user interface 14 provides the means to identify the sequence diagrams and the linking relationships, both series links and concurrent links (concurrent links may also be thought of as parallel links), among the sequence diagrams which define a scenario.

The user interface 14 allows the user to associate applications and systems and their sequence diagrams to an ICD 16 that contains the sequence diagrams and details about these systems. The user interface 14 also allows the user to cause the scenario input to be passed to the generator 12. The generator 12 then generates the suite of test cases 18 which capture the handshakes among the several systems participating in the several sequence diagrams. The user interface 14 allows the user to name the test cases 18 to be generated. This name is usually closely related to the business use case.

The generator 12 uses the scenario definition input by the user interface 14 and looks up the constituent sequence diagrams in the several ICDs 16. In some cases a scenario may only require reading in a single ICD 16. In other cases a scenario may require the generator 12 to read several ICDs 16. The generator 12 extracts the system handshakes defined in the sequence diagrams and constructs a test case 18 including each distinct handshake and arranged in the appropriate order. The generator 12 then saves all these ordered handshakes as the test case 18.

Figure 2:
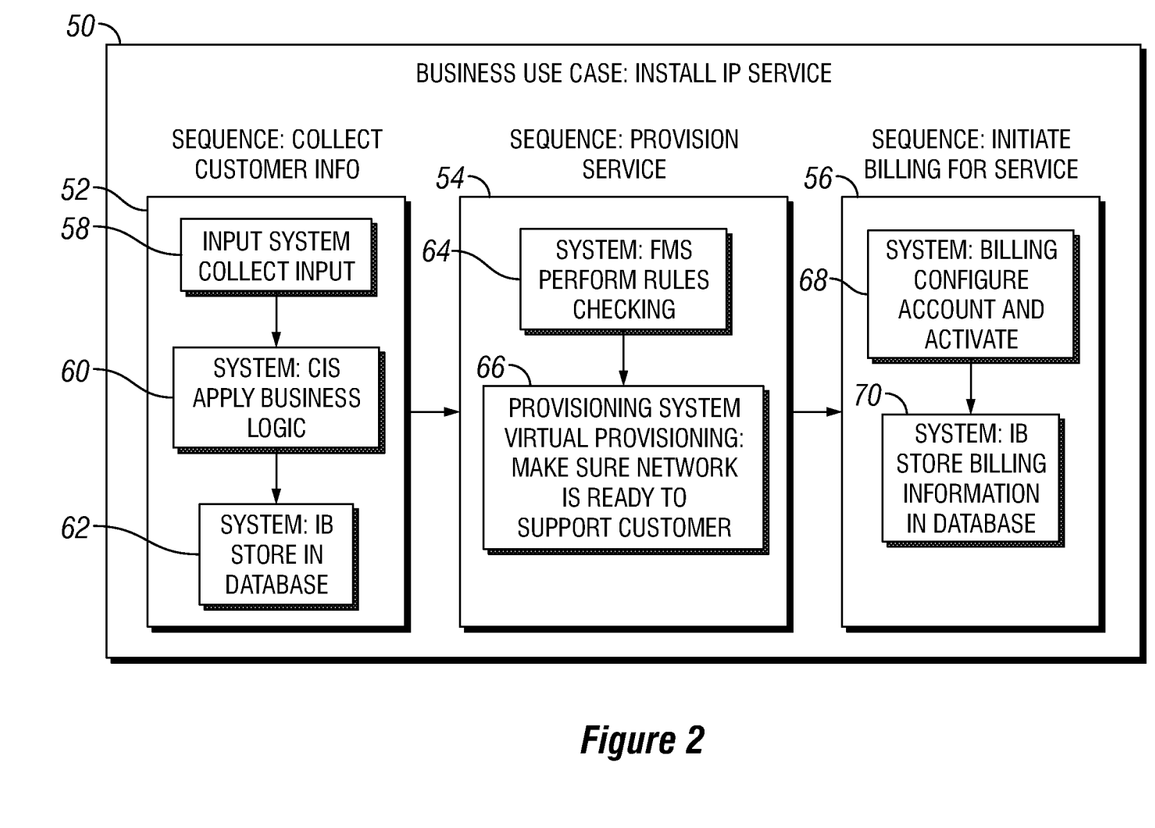
FIG. 2 illustrates an exemplary use case with three operation sequences, each operation sequence having handshakes between systems participating in the operation sequence.

Turning now to FIG. 2 an exemplary business use case 50 is depicted. The exemplary business transaction contemplated is to install Internet protocol (IP) service for a customer. Note that the test integration tool 10 is not limited to this business use case or to the systems illustrated as taking part in this business use case. This transaction can be captured in the short phrase "install IP service." Accomplishing installation of IP service for a customer may be divided into a series of intermediate level operations including collect IP customer information 52, provision IP service 54, such as configuring network devices and other systems to support the service being installed, and initiate IP billing 56. A scenario, also known as a workflow, may be defined which starts with collecting customer information 52, flows to provisioning IP service 54, and flows to initiate IP billing 56 when the workflow completes and the customer's IP service is enabled.

Each intermediate level operation can be divided into two or more low level operations. The collecting customer information 52 operation can be divided into the sequence of operations that starts with a user interface system 58 for collecting input. The user interface 58 sends messages to a customer information system (CIS) 60 which applies business logic to the customer information. The CIS 60 sends messages to the information broker (IB) 62 which is a data access layer (DAL) supported by various underlying databases. The IB 62 stores the customer information in a customer database, not shown, for example. This information is captured in a sequence diagram named "collect IP customer information."

The provision IP service 54 operation can be divided into the sequence of operations which starts with the facilities management system (FMS) 64 applying business rules to check provisioning information associated with the customer. The FMS 64 sends messages to a provisioning system 66 which conducts provisioning and makes sure the network is ready to support the customer's IP service. This information is captured in a sequence diagram named "provision IP service."

The initiate IP billing 56 operation can be divided into the sequence of operations which starts with the billing system 68 configuring a customer account. The billing system 68 sends messages to the IB 70, and the IB 70 stores the customer account information in the database. This information is captured in a sequence diagram named "initiate IP billing."

Each of the message exchanges described above and depicted by arrows inside the sequences may be termed handshakes between systems. The complete set of these handshakes, ordered appropriately, may be used to define a test case for the install IP service business use case in the example above.

Figure 3:
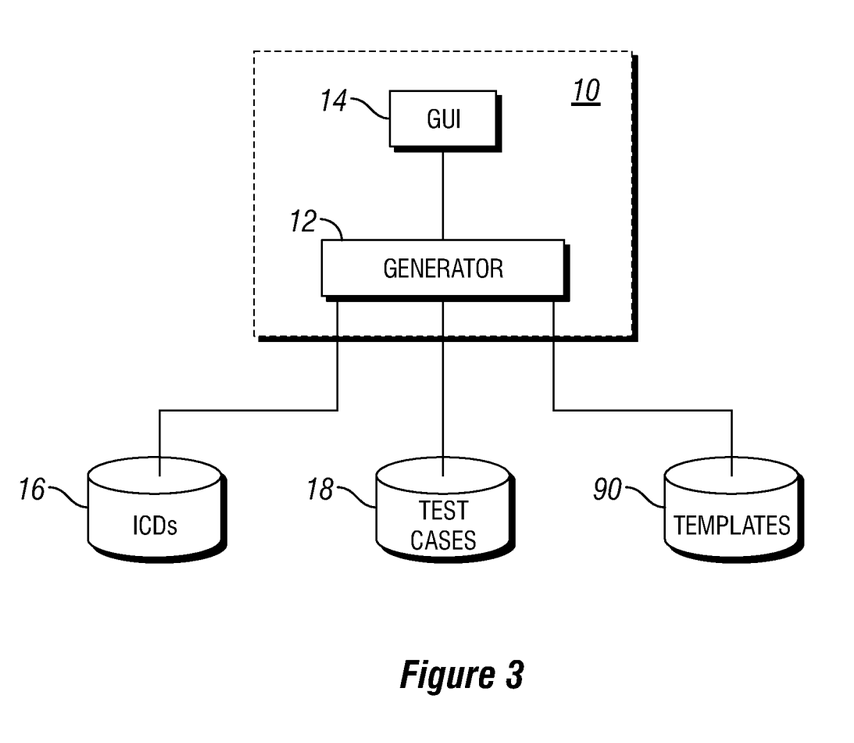
FIG. 3 is a block diagram of another embodiment of a test integration tool.

Turning now to FIG. 3 another embodiment of the test integration tool 10 is depicted. In this embodiment the user interface 14 is a graphical user interface (GUI) 14. The GUI 14 organizes user operations to generate a test case 18 into two separate activities. The first activity is defining a workflow or scenario. The second activity is generating the test case based on a predefined workflow. This alteration of the process of creating test cases 18 may have advantages in the event that some other tool, for example a test planner tool, can accept the predefined workflow as input to its own processing. There may be other advantages of this alteration of the process which appear in practice. For example, it may be that a base scenario can be defined and saved for reuse and then that related scenarios can be defined as minor modifications of the base scenario. This may be easier and less error prone than defining each scenario entirely from scratch. On the other hand, in some circumstances the more direct process for creating test cases may be more advantageous.

Figure 4:
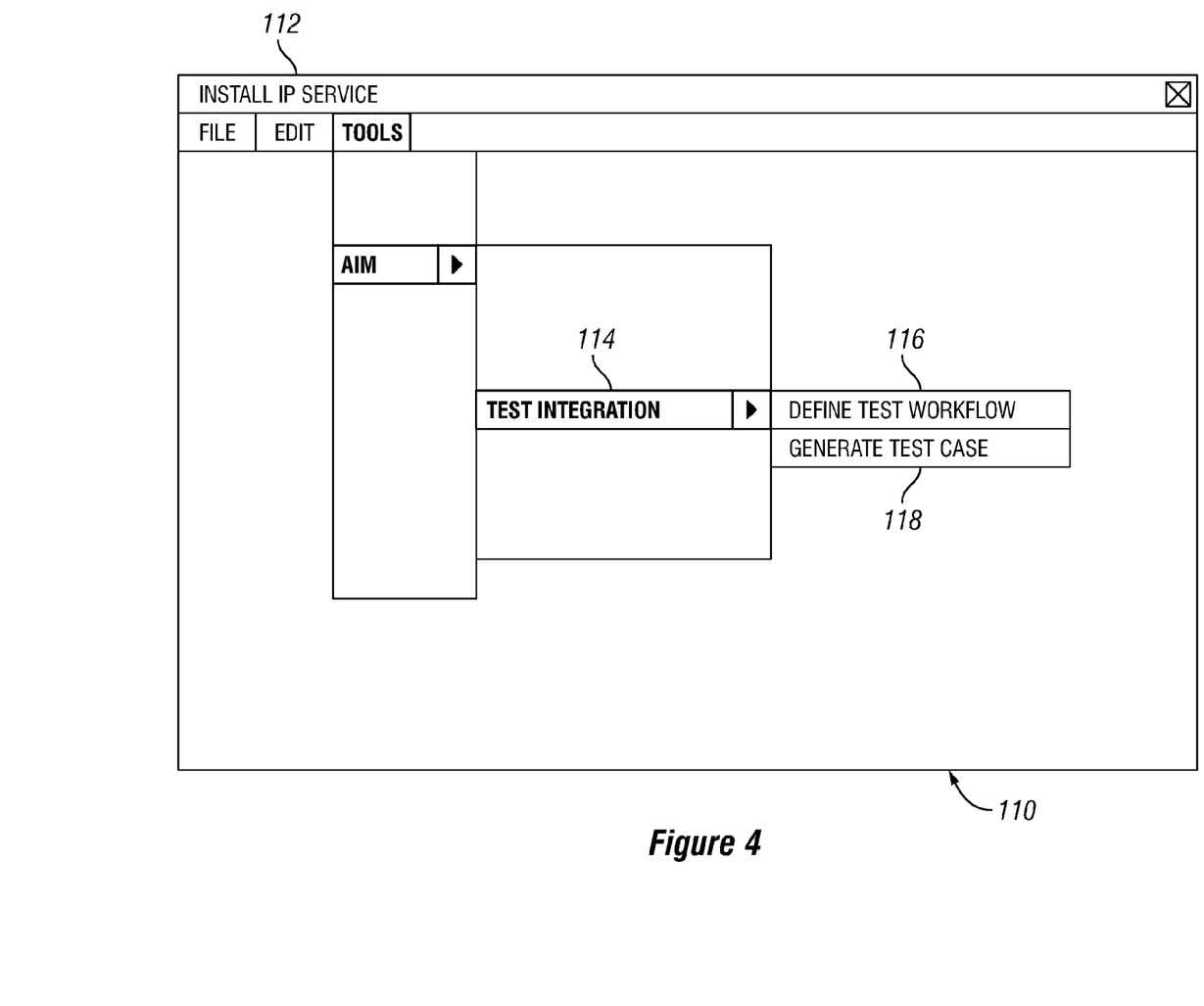
FIG. 4 illustrates an exemplary test integration graphical user interface screen.

A number of graphical user interfaces (GUIs) for enabling one embodiment of the present system are provided. It should be appreciated, however, that the present system is not limited to these illustrated embodiments. Turning now to FIG. 4 a GUI screen 110 for the test integration tool 10 is depicted. An ICD 16 is selected before bringing up the GUI screen 110, and the name of the ICD 112 is displayed at the top of the GUI screen 110. The GUI screen 110 provides a test integration menu item 114, which may appear as a submenu where the present system is integrated with other testing systems. By selecting the test integration menu item 114, another menu displays to the right including a define test workflow selection 116 and a generate test case selection 118. In one embodiment, the test integration menu item is an extension of a standard Rational Rose analysis and development software tool and is accessible via appropriate submenus.

Figure 5:
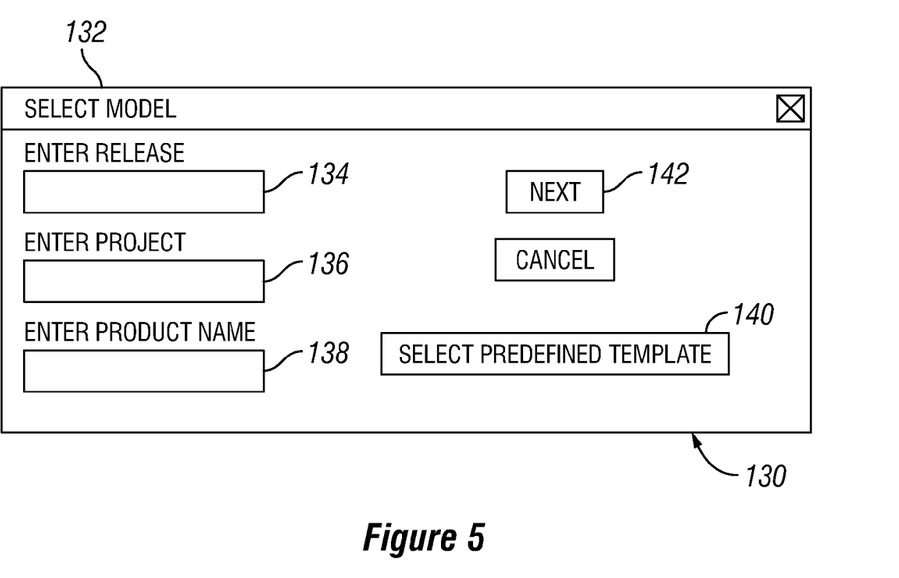
FIG. 5 illustrates an exemplary graphical user interface dialog box for model selection.

Turning now to FIG. 5, when the define test workflow menu item 116 is selected, a select model dialog box 130 displays. A select model title 132 displays at the top of the select model dialog box 130. The select model dialog box 130 provides an enter release input box 134, an enter project input box 136, and an enter product name input box 138 to be used in generating a template name. The user may also select a predefined template by clicking a select predefined template button 140. After identifying the release, project, and product the user may proceed by clicking a next button 142.

Figure 6:
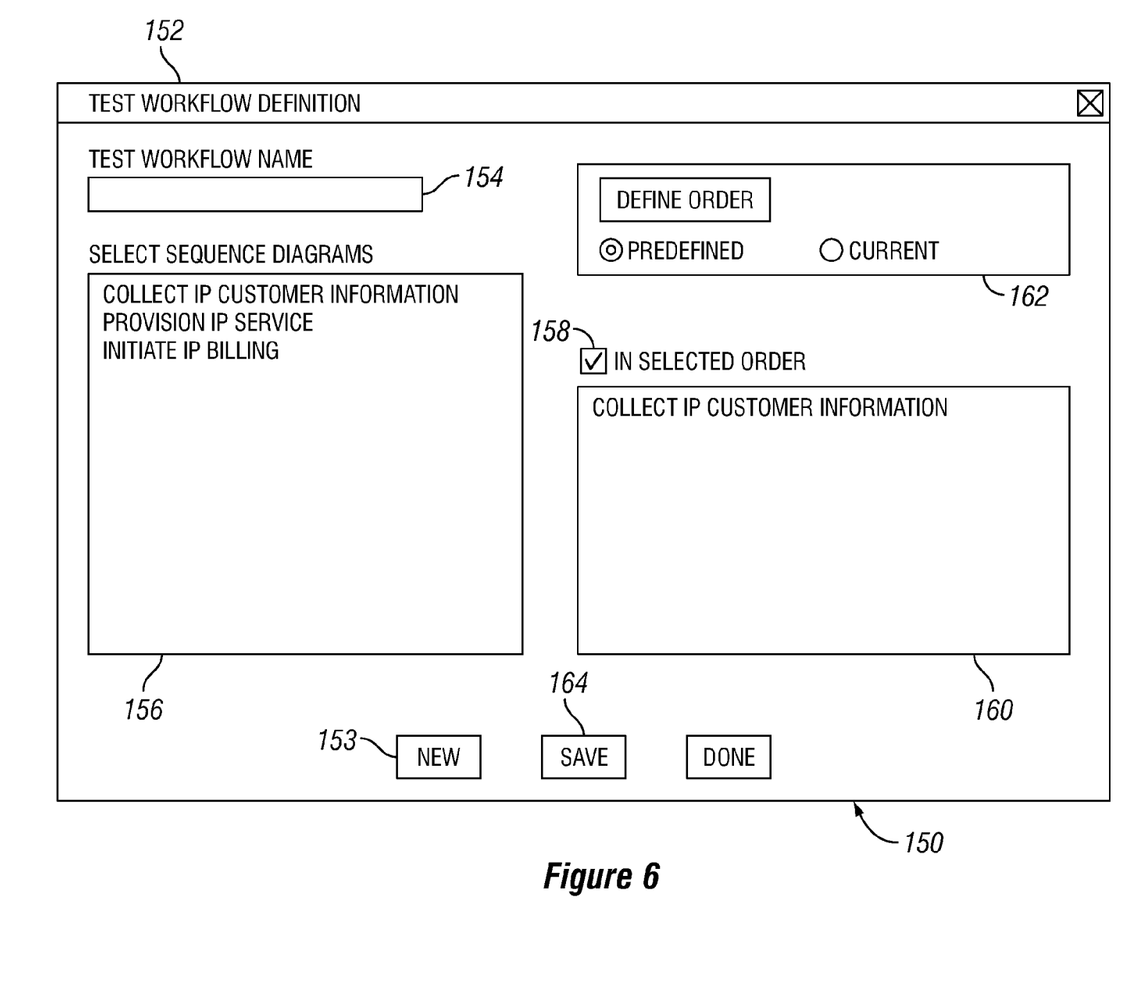
FIG. 6 illustrates an exemplary test workflow definition graphical user interface dialog box.

Turning now to FIG. 6, a test workflow definition dialog box 150 is depicted. A test workflow definition title 152 displays at the top of the test workflow definition dialog box 150. The user should select a new button 153 to define a new workflow. A test workflow name input box 154 allows the user to provide a name for the workflow being defined. A select sequence diagrams frame 156 lists sequence diagrams defined in the currently selected ICD 16. A select order check box 158 allows the user to construct the workflow sequence by clicking on the sequence diagram names displayed in the select sequence diagrams frame 156 in the order in which the user wants the workflow to proceed. Thus, the first selected sequence diagram precedes the second selected sequence diagram in the defined workflow. A sequence display frame 160 displays the sequence diagrams which have been added to the workflow in the appropriate order. If the in selected order checkbox 158 is not checked, the user may define either concurrent execution of sequence diagrams or other orders employing a define order frame 162. The defined workflow is saved by selecting a save button 164.

When the save button 164 is selected, the GUI 14 sends the inputs and a generateTestCaseTemplate message to the generator 12. The generator 12 accesses the identified ICDs 16 and extracts the needed information including sequence diagrams. The generator 12 creates a test case template containing all the associations of the workflow and saves this test case template 90. In some embodiments the test case template 90 is stored in a Microsoft Excel spreadsheet file. It may be useful to build test case templates 90 rather than directly generating test cases 18 from the user input. Test case templates 90 may be modified to create new, but related or modified, test case templates 90 to be used to generate new test cases 18 more easily than creating the entire new test case 18 from scratch.

Figure 7:
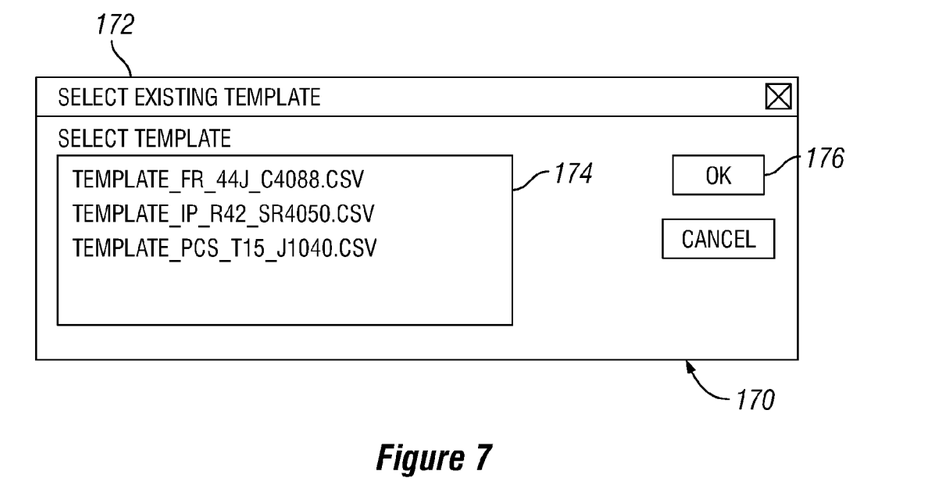
FIG. 7 illustrates an exemplary graphical user interface dialog box for selecting existing templates.

Referring now to FIG. 7, if the user clicks on the select predefined template button 140, see FIG. 5, a select existing template dialog box 170 displays. A select existing template title 172 is displayed in the top of the select existing template dialog box 170. A select template frame 174 lists all available predefined templates. A template name in the select template frame 174 highlights when selected. Once a template name is highlighted and the user clicks on an OK button 176, the select existing template dialog box 170 is removed and the test workflow definition dialog box 152 displays. The select existing template dialog box 170 also displays when the generate test case menu item 118, see FIG. 4, is selected. A template 90 is selected as described above.

Figure 8:
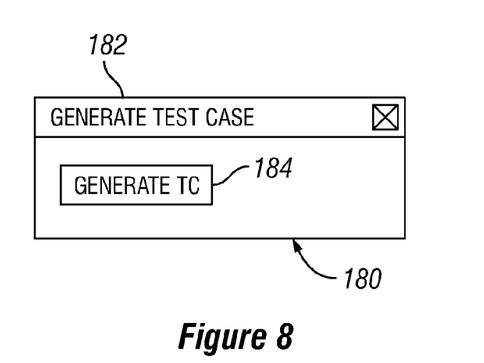
FIG. 8 illustrates an exemplary graphical user interface dialog box for generating a test case.

After the user selects the OK button 176, the select existing template dialog box 170, see FIG. 7, is removed from the display. Turning now to FIG. 8, a generate test case dialog box 180 displays, as depicted. A generate test case title 182 displays at the top of the generate test case dialog box 180. A generate TC button 184 permits the user to cause the generator 12 to build the test case from the user input. When the generate test case button 184 is selected the generator 12 processes each of the identified test case templates and generates an associated test case.

Figure 9:
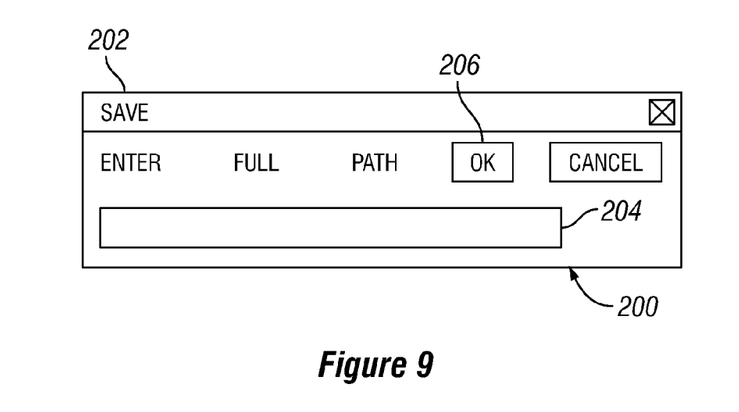
FIG. 9 illustrates an exemplary graphical user interface dialog box for saving information.

Turning now to FIG. 9 a save dialog box 200 is depicted. When the generate test case button 184 is clicked on by the user, the generator 12 generates the test case and displays the save dialog box 200. A save title 202 is displayed at the top of the save dialog box 200. An input box 204 permits the user to provide a name under which to save the generated test case. An OK button 206 permits the user to cause the save operation to take place. After saving, the save dialog box 200 is removed and the GUI screen 110 is displayed.

Note that the GUI screen 110 and the several pop-up dialog boxes described above are exemplary in character. Different displays may be used, different user input sequences may be supported by the GUI 14, and different wording in the dialog boxes may be used.

Figure 10:
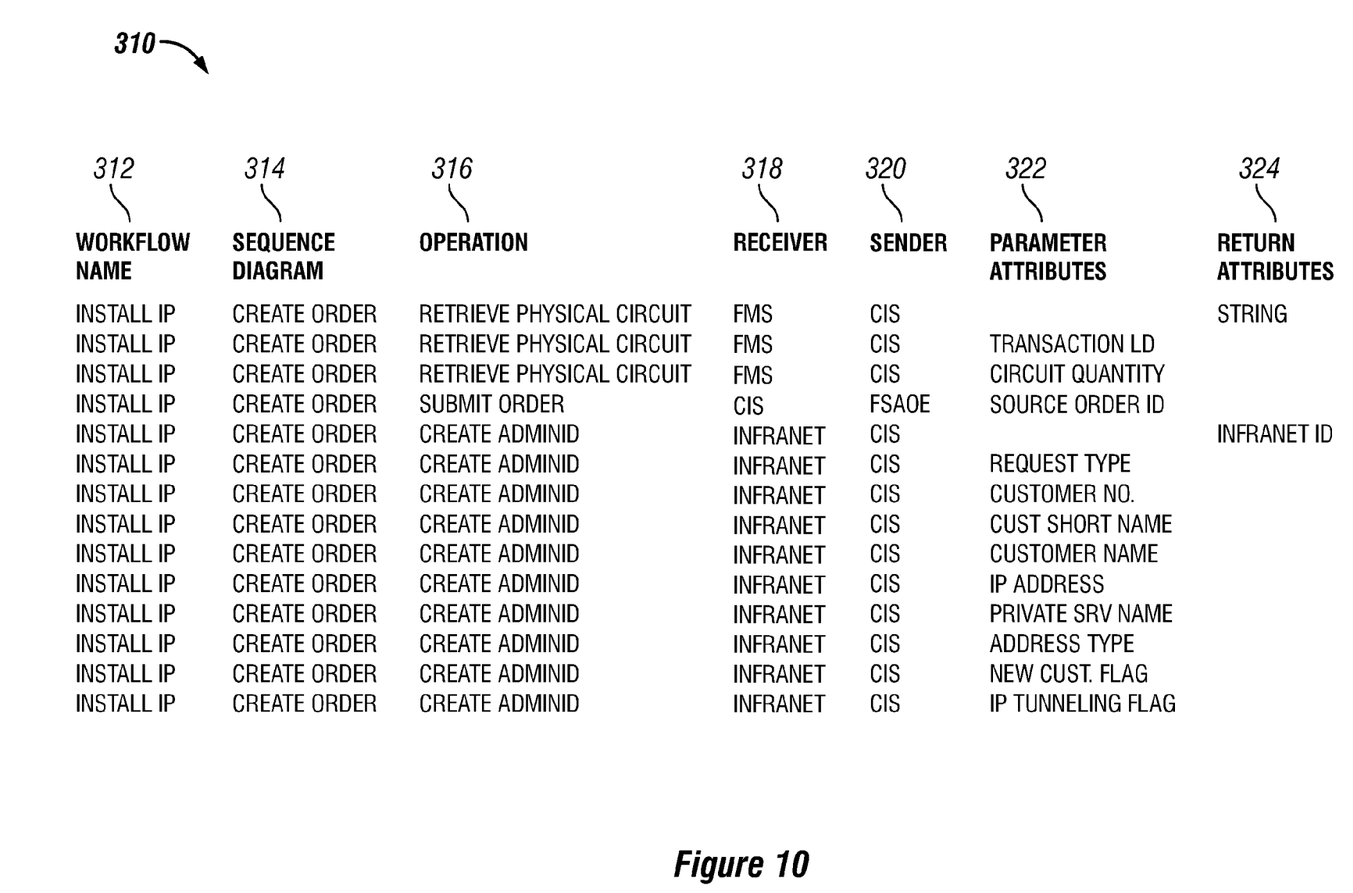
FIG. 10 illustrates an exemplary test case generated by one embodiment of the test integration tool.

Turning to FIG. 10 a depiction of an exemplary test case file 310 is shown. The test case file 310 contains columns including workflow name 312, sequence diagram name 314, operation 316, receiver 318, sender 320, parameter attributes 322, and return attributes 324. In some embodiments different columns may be employed to capture test cases. In some embodiments the test case may be stored in a Microsoft Excel spreadsheet file.

The workflow name 312 identifies the workflow defined using the define test workflow menu selection. The sequence diagram name 314 identifies the sequence diagram from which the row in this test case was generated. In some workflows, multiple sequence diagrams may be involved. In the workflow used to generate the exemplary test case of FIG. 4 only one sequence diagram is involved. The operation 316 identifies the method call invoked by this row. A single method call may be expressed through multiple rows if it is associated with multiple attributes, as only a single attribute is captured per row. The receiver 318 identifies the application or system or component or module which receives the operation input or operation request. The sender 320 identifies the application or system or component or module which sends the operation input or operation request. The parameter attributes 322 identifies one operation input or operation request argument. The return attributes 324 identifies the return expected from the receiver 318.

The information in the test case file is sufficient to perform test of software. It may also provide input to other software development tools which are able to accept and process the contents of the test case file.

Figure 11:
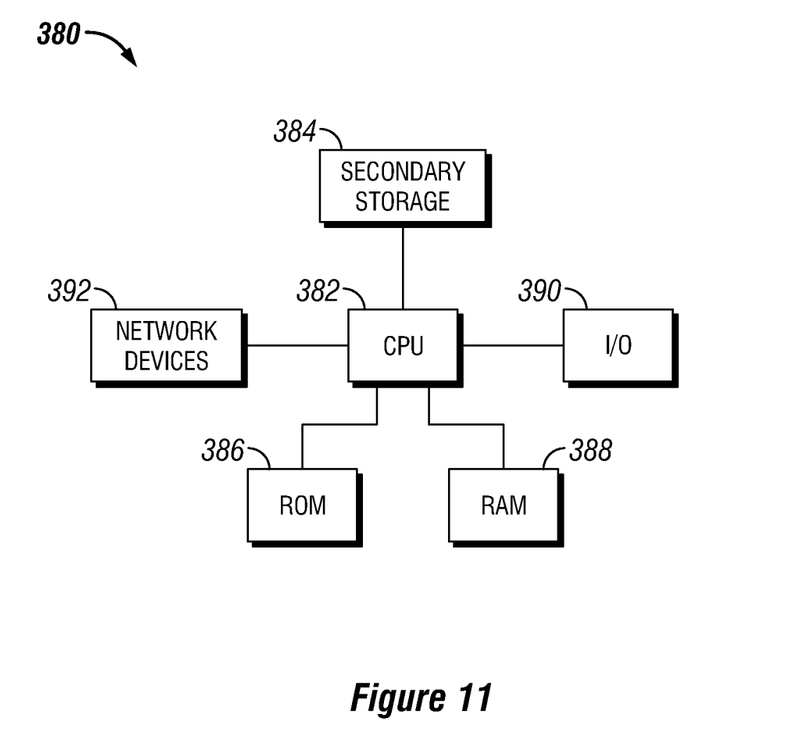
FIG. 11 illustrates an exemplary general purpose computer system suitable for implementing the several embodiments of the test integration tool.

The test integration tool 10 described above may be implemented on any general-purpose computer with sufficient processing power, memory resources, and network throughput capability to handle the necessary workload placed upon it. FIG. 11 illustrates a typical, general-purpose computer system suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) 390 devices, and network connectivity devices 392. The processor may be implemented as one or more CPU chips.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage. The RAM 388 is used to store volatile data and perhaps to store instructions. Access to both ROM 386 and RAM 388 is typically faster than to secondary storage 384.

I/O 390 devices may include printers, video monitors, keyboards, mice, track balls, voice recognizers, card readers, paper tape readers, or other well-known input devices. The network connectivity devices 392 may take the form of modems, modem banks, ethernet cards, token ring cards, fiber distributed data interface (FDDI) cards, and other well-known network devices. These network connectivity 392 devices may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392.

The test integration tool 10 leverages existing analysis and development artifacts to support the activity of generating test cases, making test case generation both easier and more closely related to the other phases of software development. The test integration tool 10 may be, used to extend existing software development tools, providing greater integration of the complete software development process. This greater integration of the software development process may enhance the development tool's ability to encourage a uniform software development process. The test integration tool 10 encourages early identification of test cases which may provide an early check on software development of system interfaces. Additionally, early test case identification may encourage software developers to consider how they will test the systems they are developing and build in supports for testing earlier rather than adding marginal testing capabilities as an after thought late in the development process. The test case template 90 supports rapid and easy generation of new test cases 18 by taking an existing test case template 90, modifying the test case template 90, and then generating new test cases 18 from this modified test case template 90.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discreet or separate may be combined or integrated with other systems, modules, techniques, or methods without departing from the scope of the present disclosure. Other items shown as directly coupled or communicating with each other may be coupled through some interface or device, such that the items may no longer be considered directly coupled to each but may still be indirectly coupled and in communication with one another. Other examples of changes, substitutions, and alterations are ascertainable by one skilled in the art and could be made without departing from the spirit and scope disclosed herein.

What we claim as our invention is:

1. A method of test integration for early application development, comprising:
    defining a business case describing a business transaction;
    defining a scenario including a series of operations that accomplish the business transaction;
    identifying a plurality of systems associated with the series of operations;
    identifying at least one interface control document describing communications between the plurality of systems that accomplish each operation in the series of operations, wherein the at least one interface control document comprises information related to the structure of data exchanged, a list of the plurality of systems which communicate with each other, and sequence diagrams representing the communications between two or more of the plurality of systems and a sequence of the communications between the two or more of the plurality of systems;
    generating a test case based on the scenario by extracting from the at least one interface control document the communications between the plurality of systems, the test case describing a plurality of inputs for a system under test and defining an expected output of the system under test in response to the plurality of inputs; and
    executing the test case by outputting the plurality of inputs to the system under test, receiving at least one output from the system under test, and comparing the at least one output with the expected output.

2. The method of claim 1, wherein the scenario identifies a sequence diagram associated with each operation in the series of operations,
    wherein the at least one interface control document is further defined as describing sequence diagrams identified in the scenario, and
    wherein each of the sequence diagrams include a sequence of communications between two or more of the plurality of systems that accomplish the associated operation.

3. The method of claim 2, wherein generating the test case is further defined as extracting from the at least one interface control document the sequence of communications for each sequence diagram identified in the scenario.

4. The method of claim 3, wherein the scenario further identifies linking relationships among the sequence diagrams identified in the scenario.

5. The method of claim 4, wherein the test case includes each distinct communication of the sequence diagrams identified in the scenario arranged in accordance with the linking relationships among the sequence diagrams in the scenario and the sequence of communications for each sequence diagram.

6. The method of claim 1, further comprising:
    determining an order in which to arrange the series of operations to accomplish the business transaction; and
    arranging the series of operations in the scenario in the order to accomplish the business transaction.

7. The method of claim 1, wherein:
    the test case includes each distinct communication between the plurality of systems and wherein each distinct communication is between a first system and a second system of the plurality of systems.

8. The method of claim 7, further comprising:
    identifying one of the first and second systems as a sender of each distinct communication and another of the first and second systems as a receiver of each distinct communication;
    identifying parameter attributes of each distinct communication;
    identifying return attributes of each distinct communication;
    outputting a report of the test case including each distinct communication, the first and second systems associated with each distinct communication, and the parameter attributes and the return attributes associated with each distinct communication.

9. The method of claim 1, further comprising identifying a plurality of interface control documents describing the communications.

10. The method of claim 1, wherein the plurality of systems are further defined as computer applications.

11. The method of claim 1, wherein the business transaction described in the business case is defined as installing internet protocol service for a customer.

12. The method of claim 1, wherein identifying the at least one interface control document is further defined as associating each of the series of operations defined in the scenario with a corresponding interface control document.

13. A testing integration system for early application development, comprising:
    an input module that receives selections of a plurality of operations that accomplish a business transaction;
    at least one interface control document defining communications between a plurality of systems, wherein the communications implement the plurality of operations, wherein the at least one interface control document comprises information related to the structure of data exchanged, a list of the plurality of systems which communicate with each other, and sequence diagrams representing the communications between two or more of the plurality of systems and a sequence of the communications between the two or more of the plurality of systems;
    a template that receives information related to the at least one interface control document and further arranges the plurality of systems to accomplish the business transaction;
    a generator that generates a test case including the communications between the plurality of systems based on the arrangement of the plurality of systems in the template, the test case describes a plurality of inputs for a system under test and defines an expected output of the system under test in response to the plurality of inputs; and
    a test unit that outputs the plurality of inputs to the system under test, receives at least one output from the system under test, and compares the at least one output with the expected output.

14. The testing integration system of claim 13, wherein the input module receives the selections from a user to arrange the plurality of operations in a user specified order to accomplish the business transaction.

15. The testing integration system of claim 13, wherein the test case generated by the generator is defined as a listing of method calls performed between the plurality of systems based on the communications.

16. The testing integration system of claim 15, wherein the listing of method calls is ordered based upon the arrangement of the plurality of operations by the user.

17. The testing integration system of claim 15, wherein the generator further identifies a sending and a receiving systems of the plurality of systems based on the method calls and further associates a parameter attributes and a return attributes with the method calls based on the communications.

18. The testing integration system of claim 13, wherein the generator analyzes the plurality of systems, the arrangement of the plurality of systems and the communications between—the plurality of system to generate the test cases.

19. The testing integration system of claim 13, wherein the test case is included in a report wherein a record in the report identifies a method call having a sending system and a receiving system based on the communications defined in the interface control document.

20. The testing integration system of claim 19, wherein the report is defined as a spreadsheet.

21. The testing integration system of claim 13, wherein the communications between the plurality of systems are further defined as method calls between at least a first and at least a second system of the plurality of systems.

22. The testing integration system of claim 13, wherein the control document includes sequence diagrams defining relationships between at least some of the plurality of systems and wherein the communications define at least one method call between a first and a second system of the plurality of systems.

23. The testing integration system of claim 22, wherein an operation of the test case includes a retrieve data operation wherein the first system is a sender and the second system is a requestor of the retrieve data operation.

24. A method of using test cases for application development and testing, comprising:
defining a business case describing a business transaction;
identifying a plurality of systems that accomplish the business transaction;
identifying at least one interface control document describing information related to the structure of data exchanged, a list of the plurality of systems which communicate with each other, and sequence diagrams, wherein each sequence diagram described in the at least one interface control document represents communications between two or more of the plurality of systems and includes a sequence of the communications between the two or more of the plurality of systems that accomplish an operation in the business transaction;
generating test cases for each of the plurality of systems by extracting from the at least one interface control document the sequences of communications associated with each of the plurality of systems, wherein each of the test cases includes a plurality of inputs to one system of the plurality of systems and defines an expected output of the one system of the plurality of systems in response to the inputs; and
executing each of the test cases by sending the plurality of inputs to the one system of the plurality of systems, receiving an output generated by the one system of the plurality of systems in response to the inputs, and comparing the received output to the expected output.

25. The method of claim 24, further comprising:
determining whether each of the test cases passes, wherein each of the test cases is determined to pass if the received output matches the expected output and is otherwise determined to fail.

26. A method of testing integration, comprising:
identifying at least one interface control document, wherein the interface control document includes information related to the structure of data exchanged, a list of the plurality of systems which communicate with each other, and a plurality of sequence diagrams, wherein each sequence diagram represents communications between the plurality of systems and includes a sequence of the communications between the plurality of systems;
positioning a first sequence diagram including a first sequence of communications between at least a first system and a second system to a first position in a scenario;
positioning a second sequence diagram including a second sequence of communications between at least a third system and a fourth system to a second position in the scenario;
generating a first test case based on the scenario by extracting the first sequence of communications and the second sequence of communications from the at least one interface control document, wherein the first test case includes the first sequence of communications and the second sequence of communications arranged according to the positioning of the first sequence diagram and the second sequence diagram, the first sequence of communications and the second sequence of communications describe a plurality of inputs for a system under test, and the first test case defines an expected output of the system under test in response to the plurality of inputs; and
executing the first test case by outputting the plurality of inputs to the system under test, receiving at least one output from the system under test, and comparing the at least one output with the expected output.

27. The method of claim 26, wherein the first test case is generated such that the first sequence of communications between the first and second systems are a first set of operations and the second sequence of communications between the third and fourth systems are a second set of operations based upon the first sequence diagram being in the first position and the second sequence diagram being in the second position in the scenario.

28. The method of claim 27, further comprising:
positioning a third sequence diagram including a third sequence of communications between at least a fifth system and a sixth system to third position in the scenario; and
generating a second test case wherein the third sequence of communications between the fourth and fifth systems are a third set of operations based upon the third sequence diagram being in the third position in the scenario.

29. The method of claim 27, further comprising:
positioning a third sequence diagram including a third sequence of communications between at least a fifth system and a sixth system to a middle position in the scenario, the middle position in the scenario located between the first and second position in the scenario; and
generating a second test case wherein the third sequence of communications between the fourth and fifth systems are a middle set of operations in the second test case based upon the third sequence diagram being in the middle position in the scenario.

30. The method of claim 29, further comprising:
saving the first scenario as a first template; and
reloading the first template.

* * * * *